United States Patent [19]

Fiedler et al.

[11] Patent Number: 5,438,911

[45] Date of Patent: Aug. 8, 1995

[54] CONTROL CYLINDER FOR PNEUMATIC CONTROL DEVICES WITH SIGNAL SWITCHES

[75] Inventors: Reiner Fiedler, Euskirchen, Germany; Johann Supanz, Hard, Austria

[73] Assignees: Numatics GmbH, Germany; PWB AG, Switzerland

[21] Appl. No.: 146,167

[22] PCT Filed: Mar. 10, 1993

[86] PCT No.: PCT/DE93/00221

§ 371 Date: Jan. 19, 1994

§ 102(e) Date: Jan. 19, 1994

[87] PCT Pub. No.: WO93/18310

PCT Pub. Date: Sep. 16, 1993

[30] Foreign Application Priority Data

Mar. 13, 1992 [DE] Germany .......... 42 07 971.3

[51] Int. Cl.⁶ .................................. F01B 25/26
[52] U.S. Cl. ................................ 92/5 R; 403/381
[58] Field of Search ............... 92/5 R; 91/1; 403/381, 403/374, 355; 200/82 E, 82 R

[56] References Cited

U.S. PATENT DOCUMENTS

| 3,577,316 | 5/1971 | Piette | 403/381 |
|---|---|---|---|
| 4,447,171 | 5/1984 | Baldoni et al. | 403/381 |
| 4,504,168 | 3/1985 | Miller | 403/381 |
| 5,222,826 | 6/1993 | Hanke | 403/381 |
| 5,335,587 | 8/1994 | Stoll | 92/5 R |

*Primary Examiner*—Thomas E. Denion
*Attorney, Agent, or Firm*—Diller, Ramik & Wight

[57] ABSTRACT

A pneumatic control device has a control cylinder with dovetailed guiding means with a guiding rail and a guiding groove for holding and guiding housings of reed-contacts or the like. The cross-sectional area of the substantially trapezoidal guiding rail of the contact housing has not the same shape as the trapezoidal cross-sectional area of the corresponding guiding groove of the control cylinder. Provided both elements (rail and groove) have substantially the same height or depth, the width of the guiding rail at the side adjacent to the contact housing is smaller than the gap width (121) of the guiding groove (12) at its open side. The total width of the guiding rail is unilaterally shortened to a size determined by a circle drawn around an edge at the narrow side of the guiding rail having a radius (133) that is at the maximum equal to the gap width (12) of the guiding groove (12). The spacing (134) between the other edge of the narrow side of the guiding rail (132) and the diametrically opposed outer edge (135) of the guiding rail (132) exceeds the gap width (121) of the guiding groove (12).

16 Claims, 1 Drawing Sheet

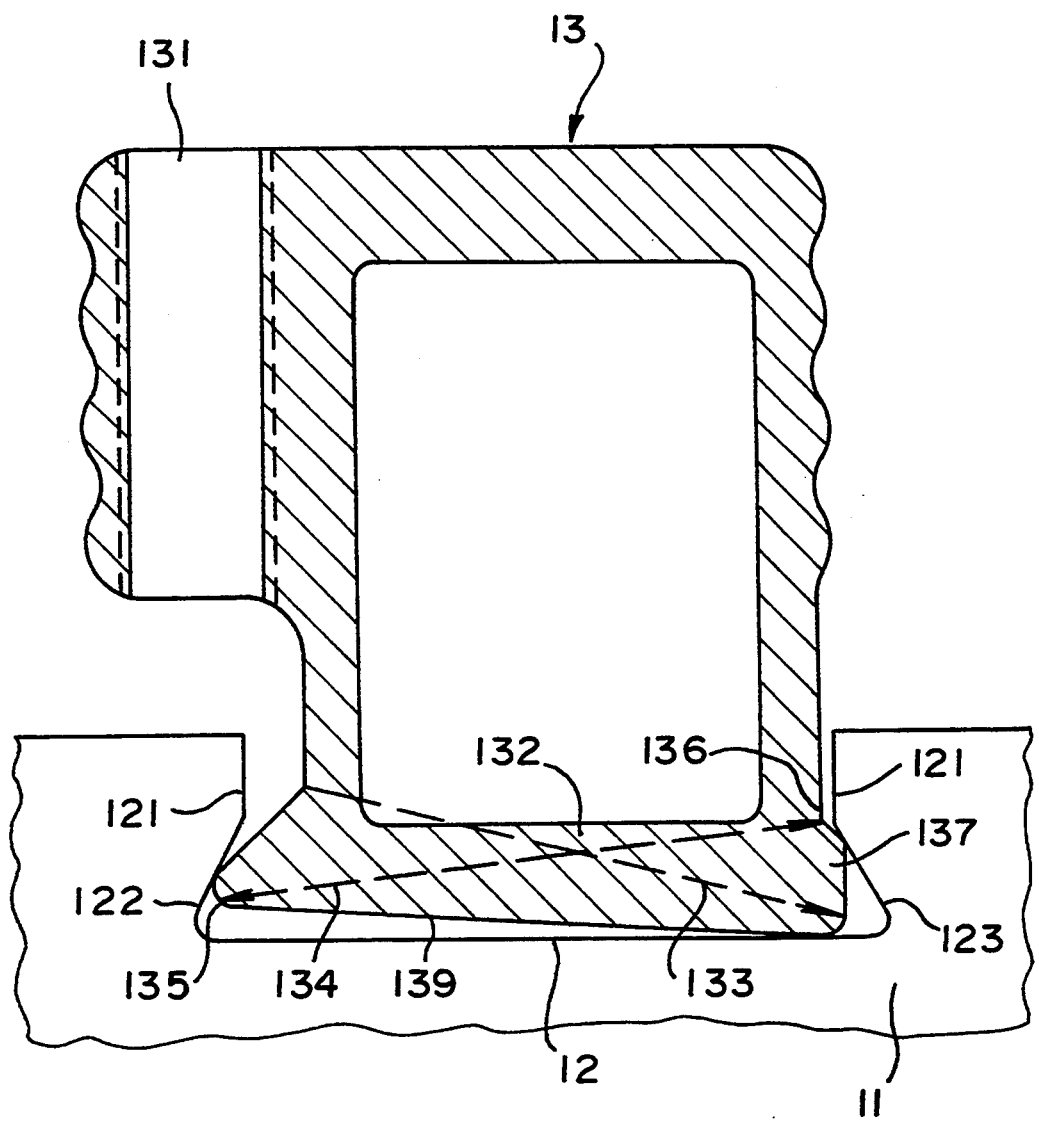

CONTROL CYLINDER FOR PNEUMATIC CONTROL DEVICES WITH SIGNAL SWITCHES

TECHNICAL FIELD

The invention concerns pneumatic control devices with a control cylinder fitted with signal, ie control switches for scanning in contactless manner the position of the control piston. Foremost the invention relates to those control devices of the cited kind which are fitted with a control cylinder comprising at its outside switch-means, especially so-called reed switches or the like, that can be controlled magnetically or electronically by the piston of said cylinder or by components connected to it, said switches opening or closing electrical circuits as soon as the piston reaches a predetermined position.

STATE OF THE ART

Such reed switches as a rule are mounted in a housing with guide elements by means of which the housing can be displaced inside a guide on the cylinder outside to allow setting and adjusting the housing's position relative to the cylinder and thereby relative to movable control piston. Such guides and guide elements are practical in the so-called dovetail design, allowing the dovetailed guide elements of the reed-switch housing to be inserted in dovetailed guide grooves matching the two end sides of the reed-switch housing. As long as the control cylinders are fitted with only one switch, this design will not entail substantive shortcomings. However if two or more signal or interrogatory switches are required to adjust the control piston, where the position of the switches must be accurately adjusted relative to the control cylinder, then as a rule if one of these switches were to fail, it will have to be disassembled together with the other switches and all must be reinstalled and readjusted again in their positions.

DISCUSSION OF THE INVENTION

The object of the invention is a control cylinder for pneumatic controls, foremost as regards devices to hold and guide the housing of a signalling or interrogatory switch, namely a design free of such shortcomings and in particular allowing the insertion or exchange of the housing into a dovetailed guide groove of the control cylinder without thereby requiring changing the position of other control or signal switches or their housings.

This problem is solved by the invention by a special design of the guide elements at the housing of the reed switch, the cross-section of the substantially trapezoidal guide rail of the switch housing evincing a shape deviating from the trapezoidal cross-section of the associated guide groove of the control cylinder, both elements, ie the rail and the groove, evincing substantially the same height or depth, but the width of the guide rail at the side adjacent to the switch housing being less than the gap width of the guide groove at its open side, the overall width of the guide rail being shortened on one side by an extent determined by a circle around the edge at the narrow side of the guide rail and of a radius at most equal to the width of the gap of the guide groove, the spacing of the other edge at the narrow side of the guide rail from the diametrically opposite outer edge of the guide rail exceeding the width of the guide groove.

To facilitate insertion of the guide rail of the switch housing into the guide groove of the control cylinder, the height of the guide rail preferably shall decrease toward the unreduced side of the dovetail. Moreover the slope of the side surfaces of the dovetail may deviate from that of the adjoining surfaces of the guide groove, in particular it may be made less. Illustratively for an angle of about 60° between the side surface and the bottom surface of the guide groove, the corresponding angle of the guide rail may be about 45°.

SHORT DESCRIPTION OF THE DRAWINGS

The invention is elucidated below by an illustrative embodiment shown on a much enlarged scale for the sake of comprehensiveness in the drawing with all its essential parts, namely the housing blank for the switch together with the adjacent parts of the control cylinder supporting it.

The drawing denotes the control cylinder by 11. A substantially dovetailed channel 12 is present in the control cylinder and corresponds in its dimensions to conventional channels for mounting reed-switch housings. The housing of the invention is received in this channel and therefore conventional housings can be exchanged against those of the invention and both kinds are selectively and simultaneously applicable.

The switch housing shown as a sectional blank and receiving a reed switch consists of an extruded hollow bar 13 substantially rectangular in cross-section and comprising a threaded borehole 131 to receive an omitted adjusting screw. The side 132 which in the drawing is the lower side of the housing 13 is a dovetailed guide rail of essentially trapezoidal cross-section. The shape and size of this trapezoid—which in conventional dovetail-guides substantially coincide with the shape and size of the associated cross-sectional surface of the guide channel—in the present case deviate from the shape and size of the trapezoidal cross-sectional surface of the channel 12 of the control cylinder 11.

The dimensions of this retention and guide rail 132 are determined by the dimensions of the guide channel 12 at the cylinder 11. In order to solve the problem which is the basis of this invention, the width of the guide rail must be a certain amount less at the side adjoining the housing 13 than the width of gap 121 of the guide channel 12 so as to provide the ability to displace the guide rail of the switch housing within the channel 12 laterally in both directions. Moreover the basically trapezoidal cross-section must be shortened at one side by the extent given by the radius 133, said radius as a maximum being allowed to reach the width of gap 121. Also the distance 134 between the outer edge 135 of the guide rail 132 and the diametrically opposite inner edge 136 of the guide rail 132 must be larger than the width of the gap 121 of the guide channel 12.

When the switch housing 13 evinces these dimensions and is inserted first by the guide-rail outer edge 135 into the channel 12, then it can be pivoted by the shortened guide-rail portion 137 past the outer edge 121 of the guide channel 12 until the guide rail 132 comes to rest on the bottom of the guide channel 12. If thereupon the adjusting screw (not shown) seated in the borehole 13 1 is tightened, it will press against the top side, ie the outer surface of the control cylinder and will force upward the guide-rail outer edge 135, whereby it moves upward on the channel sidewall 122 and thus displaces the shortened portion 137 under the sidewall 123 of the channel 12. Because the outer surface 139 acting as the underside of the guide rail is slanting upward toward the outer edge 135 and thus the guide-rail height is decreased, somewhat more play is provided to insert the housing 13.

We claim:

1. A connecting mechanism particularly adapted for utilization in a fluidic control system comprising a control cylinder and a switch housing, said connecting mechanism including a dovetail connection between said control cylinder and said switch housing, said dovetail connection being defined by a male dovetail of one of said control cylinder and switch housing seated in a female dovetail-shaped channel of the other of said control cylinder and switch housing, said male dovetail being defined by a neck and a foot disposed generally transverse to said neck, said female dovetail-shaped channel being defined by a neck channel portion and a foot channel portion disposed generally transverse to said neck channel portion, said neck channel porting having a transverse dimension which is less than a maximum transverse dimension of said dovetail-shaped channel, said neck being joined to said foot at first and second transversely spaced radius portions, said foot having transversely opposite first and second nose portions, said first nose portion and said second radius portion being generally diagonally opposite each other and defining a first diagonal distance therebetween, said second nose portion and said first radius portion being generally diagonally opposite each other and defining a second diagonal distance therebetween, and said neck channel portion transverse dimension is less than one of said diagonal distances and is more than the other of said diagonal distances.

2. The connecting mechanism as defined in claim 1 wherein said first nose portion projects transversely beyond said neck a distance greater than a transverse distance which the second nose portion projects transversely beyond said neck.

3. The connecting mechanism as defined in claim 1 wherein said first nose portion projects transversely beyond said neck a distance greater than a transverse distance which the second nose portion projects transversely beyond said neck, and said second diagonal distance being at a maximum substantially equal to said neck channel portion transverse dimension.

4. The connecting mechanism as defined in claim 1 wherein said first diagonal distance is greater than said neck channel portion transverse dimension.

5. The connecting mechanism as defined in claim 1 wherein said neck channel portion transverse dimension is less than said first diagonal distance and is more than said second diagonal distance.

6. The connecting mechanism as defined in claim 1 including transversely opposite side surfaces in part defining said nose portions and transversely opposite side surfaces in part defining transversely opposite ends of said female dovetail-shaped channel, and said nose portions side surfaces have a slope differing from a slope of said female channel ends.

7. The connecting mechanism as defined in claim 1 including transversely opposite side surfaces in part defining said nose portions and transversely opposite side surfaces in part defining transversely opposite ends of said female dovetail-shaped channel, and said nose portions side surfaces have a slope which is less than a slope of said female channel ends.

8. The connecting mechanism as defined in claim 2 wherein said first diagonal distance is greater than said neck channel portion transverse dimension.

9. The connecting mechanism as defined in claim 2 wherein said neck channel portion transverse dimension is less than said first diagonal distance and is more than said second diagonal distance.

10. The connecting mechanism as defined in claim 2 including transversely opposite side surfaces in part defining said nose portions and transversely opposite side surfaces in part defining transversely opposite ends of said female dovetail-shaped channel, and said nose portions side surfaces have a slope differing from a slope of said female channel ends.

11. The connecting mechanism as defined in claim 3 wherein said first diagonal distance is greater than said neck channel portion transverse dimension.

12. The connecting mechanism as defined in claim 3 wherein said neck channel portion transverse dimension is less than said first diagonal distance and is more than said second diagonal distance.

13. The connecting mechanism as defined in claim 3 including transversely opposite side surfaces in part defining said nose portions and transversely opposite side surfaces in part defining transversely opposite ends of said female dovetail-shaped channel, and said nose portions side surfaces have a slope differing from a slope of said female channel ends.

14. The connecting mechanism as defined in claim 11 wherein said neck channel portion transverse dimension is less than said first diagonal distance and is more than said second diagonal distance.

15. The connecting mechanism as defined in claim 11 including transversely opposite side surfaces in part defining said nose portions and transversely opposite side surfaces in part defining transversely opposite ends of said female dovetail-shaped channel, and said nose portions side surfaces have a slope differing from a slope of said female channel ends.

16. The connecting mechanism as defined in claim 14 including transversely opposite side surfaces in part defining said nose portions and transversely opposite side surfaces in part defining transversely opposite ends of said female dovetail-shaped channel, and said nose portions side surfaces have a slope differing from a slope of said female channel ends.

* * * * *